US012767499B2

(12) United States Patent
Cui

(10) Patent No.: US 12,767,499 B2
(45) Date of Patent: Oct. 20, 2026

(54) AUTOMATIC RESETTING DEVICE OF ENGAGING-DISENGAGING WINCH

(71) Applicant: Ningbo Lianda Winch Co., Ltd., Ningbo (CN)

(72) Inventor: Xiaojun Cui, Ningbo (CN)

(73) Assignee: Ningbo Lianda Winch Co., Ltd., Ningbo (CN)

( * ) Notice: Subject to any disclaimer, the term of this patent is extended or adjusted under 35 U.S.C. 154(b) by 139 days.

(21) Appl. No.: 18/805,599

(22) Filed: Aug. 15, 2024

(65) Prior Publication Data

US 2025/0388438 A1 Dec. 25, 2025

(30) Foreign Application Priority Data

Jun. 24, 2024 (CN) ......................... 202410817239.1

(51) Int. Cl.
*B66D 1/22* (2006.01)
*B66D 1/48* (2006.01)

(52) U.S. Cl.
CPC ................. *B66D 1/48* (2013.01); *B66D 1/22* (2013.01)

(58) Field of Classification Search
CPC . B66D 1/22; B66D 1/225; B66D 1/24; B66D 1/14; B66D 1/16; B66D 1/7484; F16D 11/10; F16D 11/14; F16D 41/10; F16D 23/12; F16D 47/04; F16D 2011/004; F16D 2023/123; F16D 2023/141; F16H 3/66; F16H 3/62; F16H 3/58; F16H 2200/2094; F16H 2200/2064; F16H 2200/2007; F16H 2200/201; F16H 2200/2035
See application file for complete search history.

(56) References Cited

U.S. PATENT DOCUMENTS 6,663,086 B2 * 12/2003 Huang ..................... B66D 1/22 254/344
7,588,233 B2 * 9/2009 Roe .......................... B66D 1/22 254/344
(Continued)

FOREIGN PATENT DOCUMENTS

CN 201062192 Y * 5/2008
CN 201485209 U * 5/2010
(Continued)

*Primary Examiner* — Victoria P Augustine
*Assistant Examiner* — Henrix Soto
(74) *Attorney, Agent, or Firm* — Bayramoglu Law Offices LLC

(57) ABSTRACT

The provided is an automatic resetting device of an engaging-disengaging winch. The automatic resetting device includes a winch bracket, a motor, a gear box, at least two planetary gear sets, a transmission shaft and a knob assembly. An elastic resetting assembly is disposed between the transmission shaft and the motor. A right end of the transmission shaft is connected at the rightmost planetary gear set. A one-way bearing is fixedly sleeved on a middle part of a right side plate in the rightmost planetary gear set, and a resetting drive piece is fixedly sleeved on the one-way bearing. At least one resetting protrusion is disposed circumferentially on the resetting drive piece. The resetting protrusions are axially and elastically connected to the resetting drive piece and have a tendency of protruding rightward along an axial direction.

10 Claims, 8 Drawing Sheets

(56) References Cited

U.S. PATENT DOCUMENTS

| | | | | |
|---|---|---|---|---|
| 7,703,751 | B2 * | 4/2010 | Elliott | B66D 1/22<br>254/344 |
| 7,823,864 | B2 * | 11/2010 | Xie | B66D 5/14<br>254/350 |
| 7,922,153 | B2 * | 4/2011 | Zhou | B66D 1/22<br>254/323 |
| 9,908,752 | B2 * | 3/2018 | Huang | B66D 1/22 |
| 10,280,050 | B2 * | 5/2019 | Cui | B66D 1/225 |
| 10,458,523 | B2 * | 10/2019 | Hall | F16H 3/666 |
| 11,286,138 | B2 * | 3/2022 | Yu | B66D 1/14 |

FOREIGN PATENT DOCUMENTS

| | | | | | |
|---|---|---|---|---|---|
| CN | 101844733 | A | * | 9/2010 | |
| CN | 203229342 | U | * | 10/2013 | |
| CN | 105621299 | A | * | 6/2016 | B66D 1/24 |
| CN | 205802826 | U | * | 12/2016 | |
| CN | 108194583 | A | * | 6/2018 | F16H 63/3043 |
| CN | 110745724 | A | * | 2/2020 | F16D 67/02 |

* cited by examiner

AUTOMATIC RESETTING DEVICE OF ENGAGING-DISENGAGING WINCH

CROSS-REFERENCE TO THE RELATED APPLICATIONS

This application is based upon and claims priority to Chinese Patent Application No. 202410817239.1, filed on Jun. 24, 2024, the entire contents of which are incorporated herein by reference.

TECHNICAL FIELD

The present disclosure relates to the technical field of engaging-disengaging winches, and in particular to an automatic resetting device of an engaging-disengaging winch.

BACKGROUND

The existing engaging-disengaging winches all realize engaging and disengaging between a winding drum and a planetary gear by manually rotating a toggle switch back and forth. During use, a user first rotates a knob to a disengaged state to disengage a spline on a transmission shaft from a planetary gear and thus disengage a winding drum on the spline from the planetary gear and hence enable the winch to be in an idle state. In this case, it helps to pull out a wire rope and fix it at a designated position. Then, the user also needs to return to the winch and put the switch back to an engaged state to engage the spline on the transmission shaft with the planetary gear and thus enable the winding drum on the spline to be in transmission cooperation with the planetary gear and hence enable the winch to carry out power output.

During use, after the wire rope is fixed, the user needs to return to the winch and then manually operate the toggle switch in order to enable the winch motor to work normally. In this case, the user needs to go back and forth for manual adjustment, bringing inconveniences to the users and affecting the user experiences.

SUMMARY

In order to solve the technical problem that, for the existing engaging-disengaging winches, it is required to manually put a switch back to an engaged state, which brings inconveniences to the operation, the present disclosure provides an automatic resetting device of an engaging-disengaging winch, in which it rotates to a planetary gear through a motor and brings a switch back to an engaged state by the planetary gear so as to enable the planetary gear to drive a winding drum to carry out power output and hence the user does not need to go back to the winch to manually operate the switch, bringing conveniences to the use, saving time and labor, and greatly improving the user experiences.

For the purpose of the present disclosure, the following technical solution is employed.

There is provided an automatic resetting device of an engaging-disengaging winch. The automatic resetting device comprises a winch bracket, a motor, a gear box, at least two planetary gear sets, a transmission shaft and a knob assembly. The motor and the gear box are respectively disposed at left and right sides of the winch bracket. The planetary gear sets are mounted inside the gear box. Both ends of the transmission shaft are connected with the motor and the planetary gear sets respectively. A left end of the transmission shaft is in circumferential transmission cooperation with the motor, and the transmission shaft is cooperatively connected with the motor through axial movement. An elastic resetting assembly is disposed between the transmission shaft and the motor. The elastic resetting assembly enables the transmission shaft to have a tendency of moving rightward along an axial direction. A right end of the transmission shaft is connected at the rightmost planetary gear set. A one-way bearing is fixedly sleeved on a middle part of a right side plate in the rightmost planetary gear set, and a resetting drive piece is fixedly sleeved on the one-way bearing. The resetting drive piece realizes unidirectional transmission through the one-way bearing. At least one resetting protrusion is disposed circumferentially on the resetting drive piece. The resetting protrusions are axially and elastically connected to the resetting drive piece and have a tendency of protruding rightward along an axial direction. A push forking block for driving the transmission shaft to move axially is disposed between the resetting drive piece and the gear box. The push forking block is abutted against a right end of the transmission shaft through the elastic resetting assembly, and a plurality of forking rods in transmission cooperation with the resetting protrusions are disposed circumferentially on the push forking block. With the transmission cooperation of the resetting protrusions and the forking rods, and under the action of the elastic resetting assembly, the transmission shaft axially pushes rightward the push forking block for resetting. The knob assembly is rotatably connected on the gear box, and is in transmission connection with the push forking block. The knob assembly is used to drive the rotation of the push forking block and enable the push forking block to axially push leftward the transmission shaft. With this structure, the knob assembly can be rotated to manually push leftward the transmission shaft, and the elastic resetting assembly is put in a compressed state. When the winch needs to work, the motor rotates to drive the rotation of the transmission shaft, and the transmission shaft drives the right side plate in the planetary gear set and then drives the rotation of the one-way bearing; the one-way bearing drives the unidirectional rotation of the resetting drive piece, and enables the resetting protrusions on the resetting drive piece to abut against the forking rods on the push forking block; finally, the push forking block brings the knob assembly back to an original state; with the restoring force of the elastic resetting assembly, the transmission shaft is pushed rightward so that the winding drum is engaged with the planetary gear set for transmission cooperation, so as to realize automatic resetting of the engaging-disengaging winch without manually rotating back the knob assembly, thereby bringing conveniences to user, saving labor and time, and greatly improving the user experiences. With the axial elastic connection, the resetting protrusions have a movable space to axially move leftward when abutted against the forking rods. During transmission, the case that hard collision between the resetting protrusions and the forking rods breaks the resetting protrusions or the forking rods can be reduced, improving the transmission effect, transmission safety and service life. With the one-way bearing, unidirectional idling can be realized between the resetting drive piece and the right side plate. Thus, the right side plate can drive the resetting drive piece to rotate at the time of counterclockwise rotation, and can realize unidirectional idling with the resetting drive piece at the time of clockwise rotation. When the right side plate is pressed and pushed inside, after the motor drives the right side plate to rotate clockwise, the resetting drive piece will not be rotated and thus no collision between the resetting protrusions and a push forking block occurs during the rotation process.

Finally, it can be avoided that when the winch is in an engaged state, the motor is clockwise rotated mistakenly, which results in wear or damage due to collision between the resetting protrusions on the resetting drive piece and the push forking block. In this way, the integrity, safety and service life of the entire structure can be further improved.

Preferably, axially-penetrating axial through holes are disposed in the resetting drive piece. Moving rods are movably connected on the axial through holes. Convex resetting elastic sheets are disposed between the moving rods and the resetting drive piece. An end of the convex resetting elastic sheets is fixedly connected with a left part of the moving rods, and a right part of the moving rods penetrates through a right end surface of the resetting drive piece to form the resetting protrusion. The other end of the convex resetting elastic sheets is fixedly connected with a left side of the resetting drive piece. The convex resetting elastic sheets can not only achieve the connection effect and ensure the connection reliability of the moving rods but also enable the moving rods to perform axial movement under the action of the forking rods, avoiding hard collision with the forking rods, preventing breakage of the moving rods or forking rods, and improving the transmission effect, transmission safety and service life.

Preferably, a plurality of radial drive inclined surfaces are disposed circumferentially in the gear box. A right end of each forking rod is abutted against the corresponding radial drive inclined surface. The knob assembly is in transmission connection with the push forking block; the knob assembly is used to drive the rotation of the push forking block and the push forking block axially drives the transmission shaft along the trajectory of the radial drive inclined surfaces. The forking rods rotate along the radial drive inclined surfaces so as to realize axial back-forth movement under the action of the radial drive inclined surfaces.

Preferably, both ends of the radial drive inclined surfaces are respectively provided with a first positioning part and a second positioning part for slidable positioning of the forking rods. The radial drive inclined surfaces comprise a shallow-to-deep horizontal disengagement segment, an inclined transition segment, and a horizontal engagement segment; the first positioning part is an axially-protruding positioning boss; the first positioning part is disposed at a side of the disengagement segment away from the transition segment. In a case of disengagement, the forking rods are located on the disengagement segments, and limitedly abutted against the first positioning parts; the second positioning part is an axially-protruding positioning boss; the second positioning part is disposed at a side of the engagement segment away from the transition segment. In a case of engagement, the forking rods are located on the engagement segments and limitedly abutted against the second positioning parts.

Preferably, the knob assembly comprises a positioning sleeve and a rotation wheel; the positioning sleeve is sleeved on the right end of the transmission shaft and fixedly connected with an inner wall of the gear box. The positioning sleeve surrounds the resetting protrusions and a plurality of axially-penetrating arc-shaped slide holes are disposed circumferentially on the positioning sleeve. Each resetting protrusion is located in a region corresponding to each arc-shaped slide hole. The push forking block and the transmission shaft are coaxially disposed, and a left side wall of the push forking block is abutted against a right end of the transmission shaft. Each forking rod is slidably cooperated in each arc-shaped slide hole, and an end of the forking rod is in transmission cooperation with the resetting protrusion. The rotation wheel is rotatably connected on the gear box, and the rotation wheel is connected with the push forking block and drives the push forking block to rotate. By using the arc-shaped slide holes on the positioning sleeve, a slide trajectory can be determined, such that the forking rods can be slid back and forth stably in the arc-shaped slide holes. Further, by the rotation wheel, the push forking block can be rotated so as to realize manual disengagement.

Preferably, a forking sheet mounting chamber for axial movement of the push forking block is disposed in a middle part of the rotation wheel. Axially-distributed forking rod grooves into which the forking rods are fitted are disposed on a peripheral wall of the rotation wheel, and thus synchronous rotation of the rotation wheel and the push forking block can be achieved. By enabling the forking rods to move along the radial drive inclined surfaces, the push forking block is axially moved in the forking sheet mounting chamber. The forking rod grooves guarantee the rotation of the push forking block and the forking sheet mounting chamber guarantees the axial movement of the push forking block, so as to facilitate automatic engagement and disengagement of the winch.

Preferably, the knob assembly further comprises a rotation knob; a positioning fitting groove is disposed on a right end surface of the rotation wheel; a positioning fitting block is disposed on the rotation knob; the positioning fitting block is fitted to the positioning fitting groove and the rotation knob is fixedly connected by a switch screw to the rotation wheel and further, the rotation knob is rotatably connected to a right side wall of the gear box. With the rotation knob, the user can easily perform switching operation, bringing conveniences and saving labor.

Preferably, the elastic resetting assembly comprises a coupling sleeve, a spring, and a spring positioning clamping ring; a left end of the coupling sleeve is connected to an output shaft of the motor, and a right end of the coupling sleeve is provided with an insertion hole; the transmission shaft is axially moved to be connected in the insertion hole; the spring positioning clamping ring is fixedly fitted on the transmission shaft; the spring is sleeved on the transmission shaft, a left end of the spring is abutted against a right end surface of the coupling sleeve, and a right end of the spring is abutted against the spring positioning clamping ring. With the spring positioning clamping ring and the coupling sleeve, both ends of the spring can be limited, and further, the axial movement of the transmission shaft can be achieved under the action of the spring.

Preferably, three planetary gear sets are disposed in the planetary gear housing; a spline sleeve is rotatably sleeved on a middle segment of the transmission shaft; the spline sleeve is in transmission cooperation with the leftmost planetary gear set. In a case of disengagement, the spline sleeve is disengaged from a spline groove in the center of the leftmost planetary gear set; in a case of engagement, the spline sleeve is engaged with the spline groove in the center of the leftmost planetary gear set; a spline positioning clamping groove is respectively disposed at left and right sides of the spline sleeve on the transmission shaft; a spline positioning clamping ring is sleeved on each spline positioning clamping groove; left and right end surfaces of the spline sleeve are respectively abutted against end surfaces of the two spline positioning clamping rings. With the spline sleeve, engagement and disengagement with the planetary gear sets can be easily realized. Further, with the spline positioning clamping rings, the spline sleeve can be better limited, ensuring the spline sleeve does not suffer axial displacement during rotation.

Preferably, the device further comprises a winding drum. The winding drum is rotatably connected to the winch bracket and sleeved on the transmission shaft, and further, a spline cooperation through hole is disposed at a right end of the winding drum. The spline sleeve is axially moved to be connected in the spline cooperation through hole, and thus the spline sleeve drives the winding drum to perform synchronous rotation.

In conclusion, the present disclosure has the following advantages: in the structure, by rotating the knob assembly, the transmission shaft is manually pushed leftward and the elastic resetting assembly is put in a compressed state. When the winch needs to work, the motor rotates to drive the rotation of the transmission shaft, and the transmission shaft drives the right side plate in the planetary gear set and then drives the rotation of the one-way bearing; the one-way bearing drives the resetting drive piece to make unidirectional rotation, and enables the resetting protrusions on the resetting drive piece to abut against the forking rods on the push forking block; finally, the push forking block brings the knob assembly back to an original state; with the restoring force of the elastic resetting assembly, the transmission shaft is pushed rightward and thus the winding drum is engaged with the planetary gear set for transmission cooperation, so as to realize automatic resetting of the engaging-disengaging winch without manually rotating back the knob assembly, thereby bringing conveniences to user, saving labor and time, and greatly improving the user experiences. With the axial elastic connection, the resetting protrusions have a movable space to axially move leftward when abutted against the forking rods. During transmission, the case that hard collision between the resetting protrusions and the forking rods breaks the resetting protrusions or the forking rods can be reduced, improving the transmission effect, transmission safety and service life. With the one-way bearing, unidirectional idling can be realized between the resetting drive piece and the right side plate. Thus, the right side plate can drive the resetting drive piece to rotate at the time of counterclockwise rotation, and can realize unidirectional idling with the resetting drive piece at the time of clockwise rotation. When the right side plate is pressed and pushed inside, after the motor drives the right side plate to rotate clockwise, the resetting drive piece will not be rotated and thus no collision between the resetting protrusions and the push forking block occurs during the rotation process. Finally, it can be avoided that when the winch is in an engaged state, the motor is clockwise rotated mistakenly, which results in wear or damage due to collision between the resetting protrusions on the resetting drive piece and the push forking block. In this way, the integrity, safety and service life of the entire structure can be further improved.

BRIEF DESCRIPTIONS OF THE DRAWINGS

Figure 1:
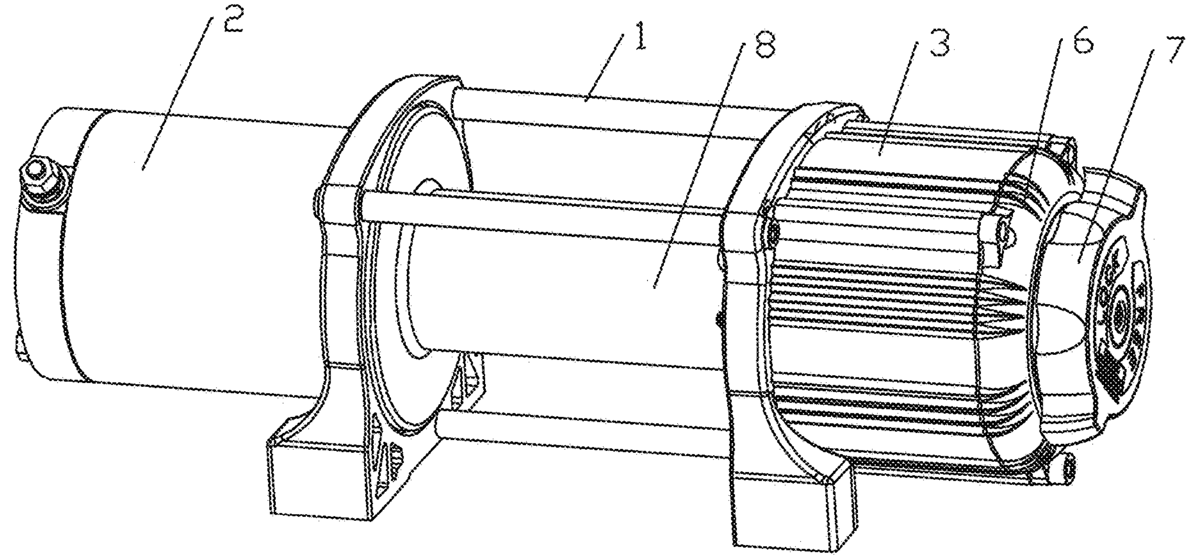
FIG. 1 is a schematic diagram illustrating an automatic resetting device of an engaging-disengaging winch according to the present disclosure.

Numerals of the drawings are described below:

1. winch bracket, 2. motor, 3. planetary gear housing, 4. planetary gear set, 40. right side plate, 41. spline groove, 5. transmission shaft, 50. elastic resetting assembly, 501. coupling sleeve, 502. spring, 503. spring positioning clamping ring, 504. insertion hole, 51. spline sleeve, 511. spline positioning clamping groove, 512. spline positioning clamping ring, 52. one-way bearing, 53. resetting drive piece, 531. resetting protrusion, 532. convex resetting elastic sheet, 533. limiting protrusion ring, 55. moving rod, 6. end cover, 61. radial drive inclined surface, 611. disengagement segment, 612. transition segment, 613. engagement segment, 614. first positioning part, 615. second positioning part, 7. knob assembly, 71. positioning sleeve, 711. arc-shaped slide hole, 72. push forking block, 721. forking rod, 7211. radial part, 7212. axial part, 73. rotation wheel, 730. forking sheet mounting chamber, 731. forking rod groove, 732. positioning fitting groove, 74. rotation knob, 741. positioning fitting block, 75. switch screw, 8. winding drum, and 81. spline cooperation through hole.

DETAILED DESCRIPTIONS OF THE EMBODIMENTS

In order to make the above objects, features and advantages of the present disclosure clearer and more intelligible, the specific embodiments of the present disclosure will be further detailed below in combination with drawings.

As shown in FIGS. 1 to 9, there is provided an automatic resetting device of an engaging-disengaging winch. The automatic resetting device comprises a winch bracket 1, a motor 2, a gear box, at least two planetary gear sets 4, a transmission shaft 5 and a knob assembly 7. The gear box may be integrally formed or divided into a planetary gear housing 3 and an end cover 6. In an embodiment, the planetary gear housing 3 and the end cover 6 may be detachably connected to facilitate mounting and maintenance. The winch bracket 1 is formed by supporting plates at left and right sides and multiple horizontal connection rods in middle. The motor 2 and the planetary gear housing 3 are respectively disposed at left and right sides of the winch bracket 1. The planetary gear sets 4 are mounted inside the planetary gear housing 3. Both ends of the transmission shaft 5 are connected with the motor 2 and the planetary gear sets 4 respectively. The end cover 6 is fixed at a right side of the planetary gear housing 3 by end cover connection screws, and closes the planetary gear housing 3. The knob assembly 7 is rotatably connected at a right side of the end cover 6. A left end of the transmission shaft 5 is in circumferential transmission cooperation with the motor 2, and the transmission shaft 5 is cooperatively connected with the motor 2 through axial movement. An elastic resetting assembly 50 is disposed between the transmission shaft 5 and the motor 2. The elastic resetting assembly 50 enables the transmission shaft 5 to have a tendency of moving rightward along an axial direction. The elastic resetting assembly 50 is in a disengaged state when compressed, and in an engaged stated when in a normal state. A right end of the transmission shaft 5 is connected at the rightmost planetary gear set 4. A one-way bearing 52 is fixedly sleeved on a middle part of a right side plate 40 in the rightmost planetary gear set 4, and a resetting drive piece 53 is fixedly sleeved on the one-way bearing 52. With the internal rotational structure of the one-way bearing 52, the resetting drive piece 53 is enabled to idle at the time of clockwise rotation and rotate in synchronization with the right side plate 40 at the time of counterclockwise rotation. The resetting drive piece 53 is a hollow turntable structure. A plurality of resetting protrusions 531 are disposed circumferentially on a right end surface of the resetting drive piece 53, and connected to the resetting drive piece 53 by axial movement. Convex resetting elastic sheets 532 are disposed between the resetting protrusions 531 and the resetting drive piece 53. The convex resetting elastic sheets 532 enable the resetting protrusions 531 to have a tendency of protruding rightward along an axial direction. With the one-way bearing 52, unidirectional idling can be realized between the resetting drive piece 53 and the right side plate 40. Thus, the right side plate 40 can drive the resetting drive piece 53 to rotate at the time of counterclockwise rotation, and can realize unidirectional idling with the resetting drive piece 53 at the time of clockwise rotation. When the right side plate 40 is pressed and pushed inside, after the motor 2 drives the right side plate 40 to rotate clockwise, the resetting drive piece 53 will not be rotated and thus no collision between the resetting protrusions 531 and a push forking block 72 occurs during the rotation process. Finally, it can be avoided that when the winch is in an engaged state, the motor is clockwise rotated mistakenly, which results in wear or damage due to collision between the resetting protrusions 531 on the resetting drive piece 53 and the push forking block 72. In this way, the integrity, safety and service life of the entire structure can be further improved.

The resetting drive piece 53 is a hollow turntable structure, and fixedly sleeved on the one-way bearing 52. Axially-penetrating axial through holes are disposed in the resetting drive piece 53. Moving rods 55 are movably connected on the axial through holes. The convex resetting elastic sheets 532 are located at a left side of the resetting drive piece 53. An end of the convex resetting elastic sheets 532 is fixedly connected with a left part of the moving rods 55, and a right part of the moving rods 55 penetrates through a right end surface of the resetting drive piece 53 to form the resetting protrusion 531. The other end of the convex resetting elastic sheets 532 is fixedly connected with a left side of the resetting drive piece 53. A limiting protrusion ring 533 is disposed at a left part of the moving rods 55. Under the action of the convex resetting elastic sheets 532, the moving rods 55 have the tendency of ejecting rightward, and abut against a left end surface of the resetting drive piece 53 through the limiting protrusion rings 533, so as to help position the moving rods 55 and prevent the moving rods 55 from fully penetrating into the axial through holes and thus better control the elastic force of the convex resetting elastic sheets 532. The convex resetting elastic sheets 532 can guarantee the connectivity and reliability of the moving rods 55. Further, when forking rods 721 are abutted against the moving rods 55, the moving rods 55 have a movable space to move leftward along an axial direction. During transmission, the case that hard collision between the resetting protrusions 531 and the forking rods 721 breaks the resetting protrusions 531 or the forking rods 721 can be reduced, and in case of no abutting against the resetting protrusions 531, with the elastic force of the convex resetting elastic sheets 532, the moving rods 55 are always in a state of protruding rightward along an axial direction toward the resetting drive piece 53, improving the transmission effect, transmission safety and service life.

The push forking block 72 for driving the transmission shaft 5 to move axially is disposed between the resetting drive piece 53 and the end cover 6. The push forking block 72 is abutted against a right end of the transmission shaft 5 through the elastic resetting assembly 50, and a plurality of forking rods 721 in transmission cooperation with the resetting protrusions 531 are disposed circumferentially on the push forking block 72. A plurality of radial drive inclined surfaces 61 are disposed circumferentially in the end cover 6. A right end of each forking rod 721 is abutted against the corresponding radial drive inclined surface 61. Both ends of the radial drive inclined surfaces 61 are respectively provided with a first positioning part 614 and a second positioning part 615 for slidable positioning of the forking rods 721. The resetting protrusions 531 are abutted against the forking rods 721 to rotate the push forking block 72 along the radial drive inclined surfaces 61 and enable the transmission shaft 5 to move rightward for resetting along an axial direction under the action of the elastic resetting assembly 50. In this way, a spline sleeve 51 on the transmission shaft 5 is engaged with the planetary gear sets 4 and hence a winding drum 8 sleeved on the spline sleeve 51 is in transmission cooperation with the planetary gear sets 4, and finally, power output is achieved. The knob assembly 7 is in transmission connection with the push forking block 72; the knob assembly 7 is used to drive the rotation of the push forking block 72 and the push forking block 72 axially drives the transmission shaft 5 along the trajectory of the radial drive inclined surfaces 61.

In this device, by rotating the knob assembly 7, the transmission shaft 5 is manually pushed leftward and the elastic resetting assembly 50 is put in a compressed state. When the winch needs to work, the motor 2 rotates to drive the rotation of the transmission shaft 5, and the transmission shaft 5 drives the right side plate 40 in the planetary gear set 4 and then drives the rotation of the one-way bearing 52; the one-way bearing 52 drives the rotation of the resetting drive piece 53, and enables the resetting protrusions 531 on the resetting drive piece 53 to abut against the forking rods 721 on the push forking block 72; the forking rods 721 rotate along the radial drive inclined surfaces 61 and finally, the push forking block 72 brings the knob assembly 7 back to an original state; with the restoring force of the elastic resetting assembly 50, the winding drum 8 is engaged with the leftmost planetary gear set 4, so as to realize automatic resetting of the engaging-disengaging winch without manually rotating back the knob assembly 7, thereby bringing conveniences to user, saving labor and time, and greatly improving the user experiences.

Figure 7:
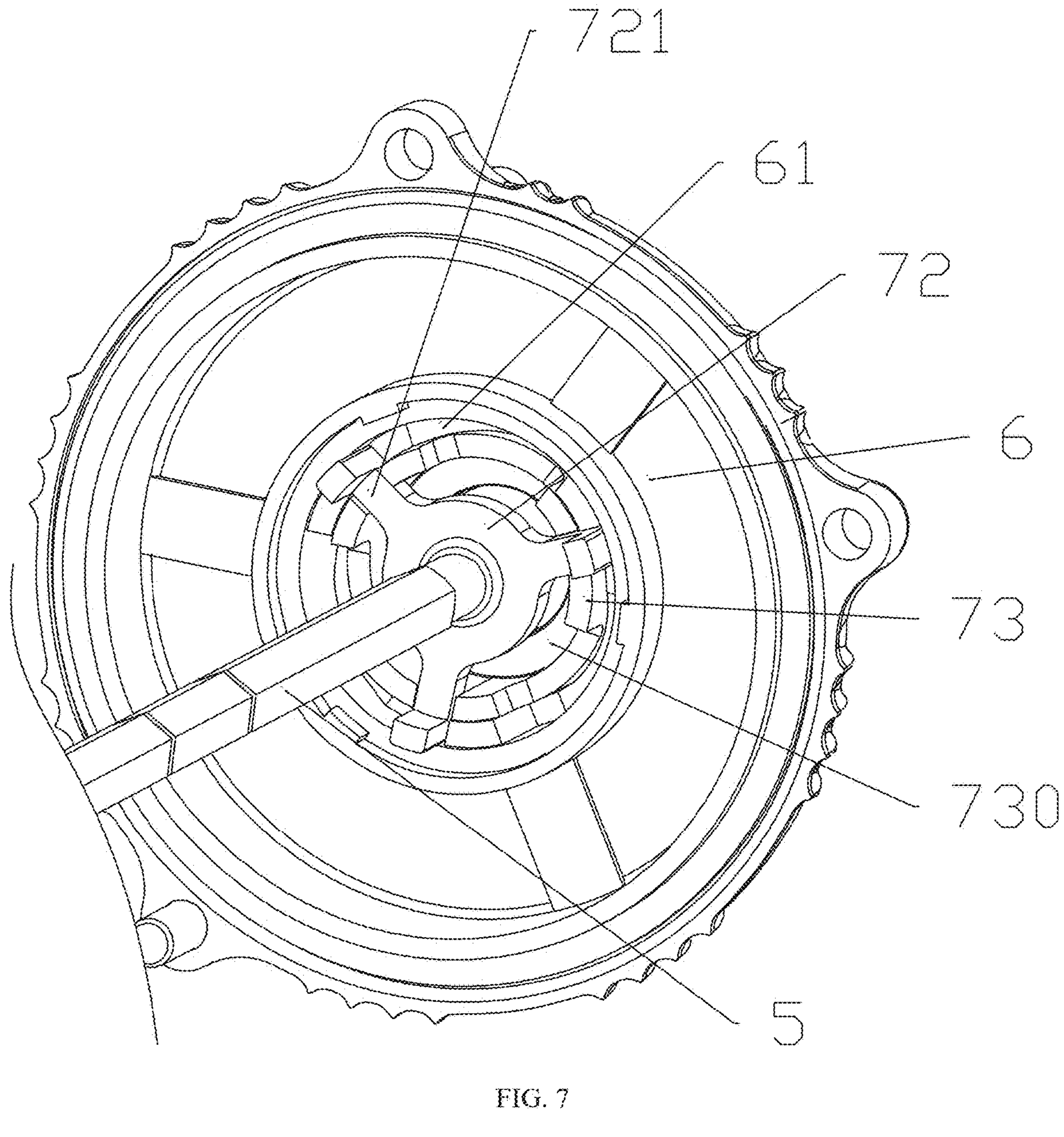
FIG. 7 is a schematic diagram illustrating an interior of an end cover according to the present disclosure.
Figure 8:
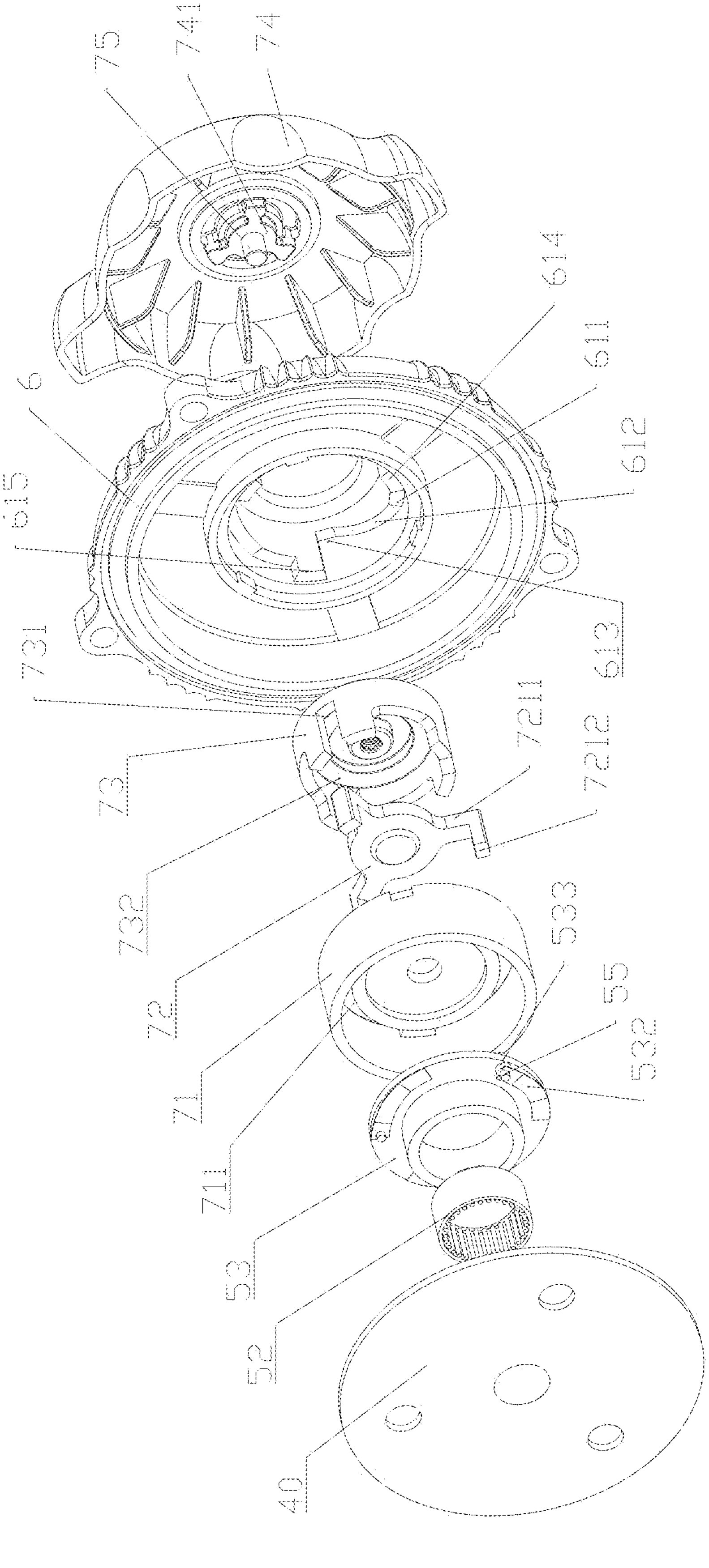
FIG. 8 is an exploded view illustrating a knob assembly at a left view angle according to the present disclosure.
Figure 9:
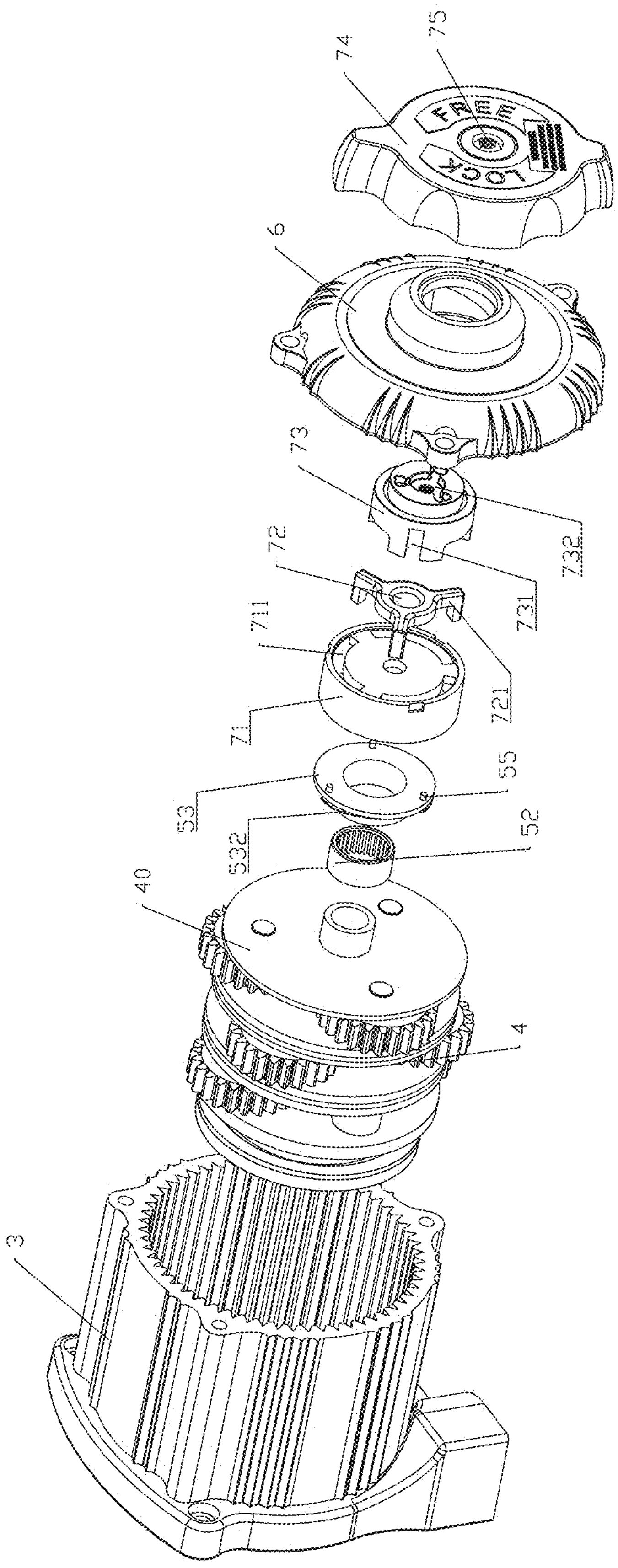
FIG. 9 is an exploded view illustrating a knob assembly at a right view angle according to the present disclosure.

As shown in FIGS. 7 and 8, the radial drive inclined surfaces 61 comprise a shallow-to-deep horizontal disengagement segment 611, an inclined transition segment 612, and a horizontal engagement segment 613; the first positioning part 614 is an axially-protruding positioning boss; the first positioning part 614 is disposed at a side of the disengagement segment 611 away from the transition segment 612. In a case of disengagement, the forking rods 721 are located on the disengagement segments 611, and limitedly abutted against the first positioning parts 614; the second positioning part 615 is an axially-protruding positioning boss; the second positioning part 615 is disposed at a side of the engagement segment 613 away from the transition segment 612. In a case of engagement, the forking rods 721 are located on the engagement segments 613 and limitedly abutted against the second positioning parts 615.

As shown in FIGS. 4 to 9, the knob assembly 7 comprises a positioning sleeve 71 and a rotation wheel 73; the positioning sleeve 71 is sleeved on the right end of the transmission shaft 5 and fixedly connected with an inner wall of the end cover 6; relative fixing is achieved by fitting three equally-spaced and circumferentially-distributed fitting notches on the positioning sleeve 71 to three equally-spaced and circumferentially-distributed fitting blocks on the inner wall of the end cover 6. The positioning sleeve 71 surrounds the resetting protrusions 531 and a plurality of axially-penetrating arc-shaped slide holes 711 are disposed circumferentially on the positioning sleeve 71. Each resetting protrusion 531 is located in a region corresponding to each arc-shaped slide hole 711. The push forking block 72 and the transmission shaft 5 are coaxially disposed, and a left side wall of the push forking block 72 is abutted against a right end of the transmission shaft 5. Each forking rod 721 is slidably cooperated in each arc-shaped slide hole 711, and an end of the forking rod 721 is in transmission cooperation with the resetting protrusion 531. The rotation wheel 73 is rotatably connected on the end cover 6, and the rotation wheel 73 is connected with the push forking block 72 and drives the push forking block 72 to rotate. By using the arc-shaped slide holes 711 on the positioning sleeve 71, a slide trajectory can be determined, such that the forking rods 721 can be slid back and forth stably in the arc-shaped slide holes 711. Further, by the rotation wheel 73, the push forking block 72 can be rotated so as to realize manual disengagement. A forking sheet mounting chamber 730 for axial movement of the push forking block 72 is disposed in a middle part of the rotation wheel 73. Axially-distributed forking rod grooves 731 into which the forking rods 721 are fitted are disposed on a peripheral wall of the rotation wheel 73, and thus synchronous rotation of the rotation wheel 73 and the push forking block 72 can be achieved. By enabling the forking rods 721 to move along the radial drive inclined surfaces 61, the push forking block 72 is axially moved in the forking sheet mounting chamber 730.

As shown in FIGS. 4 to 9, three arc-shaped slide holes 711 are disposed in equal spacing circumferentially on the positioning sleeve 71; three resetting protrusions 531 are disposed in equal spacing circumferentially on a right end surface of the resetting drive piece 53; three L-shaped forking rods 721 are disposed in equal spacing circumferentially on the push forking block 72; three radial drive inclined surfaces 61 matching the forking rods 721 are disposed in equal spacing circumferentially on the end cover 6; three forking rod grooves 731 are disposed in equal spacing circumferentially on the rotation wheel 73; radial parts 7211 of the forking rods 721 are cooperatively inserted into the forking rod grooves 731, and axial parts 7212 of the forking rods 721 are axially inserted into the arc-shaped slide holes 711. The first positioning part 614 is located between two adjacent radial drive inclined surfaces 61 and the second positioning part 615 is located between two adjacent radial drive inclined surfaces 61. The disposal of three radial drive inclined surfaces 61 can guarantee rotation stability and coaxiality as well as rotation matching degree and transmission accuracy.

As shown in FIGS. 4 to 9, the knob assembly 7 further comprises a rotation knob 74; a positioning fitting groove 732 is disposed on a right end surface of the rotation wheel 73; a positioning fitting block 741 is disposed on the rotation knob 74; the positioning fitting block 741 is fitted to the positioning fitting groove 732 and the rotation knob 74 is fixedly connected by a switch screw 75 to the rotation wheel 73 and further, the rotation knob 74 is rotatably connected to a right side wall of the end cover 6.

Figure 2:
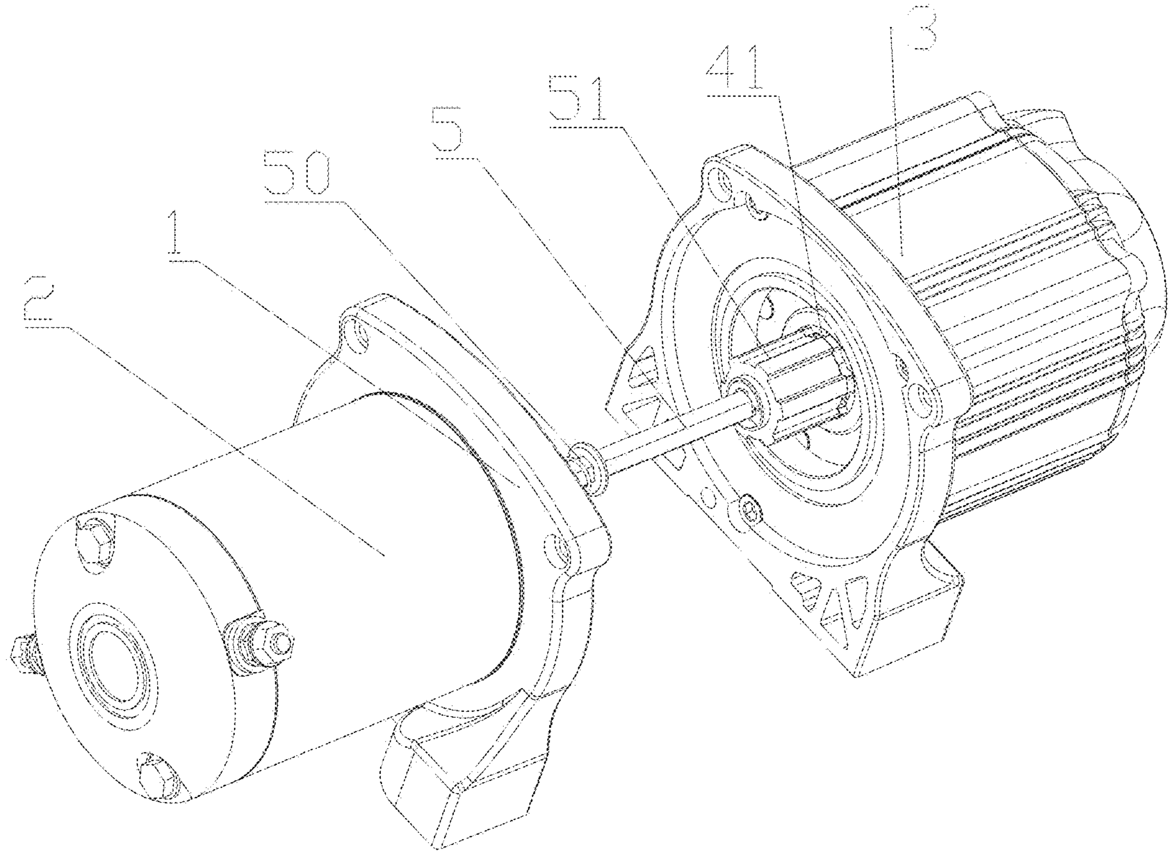
FIG. 2 is a schematic diagram illustrating a transmission shaft according to the present disclosure.
Figure 3:
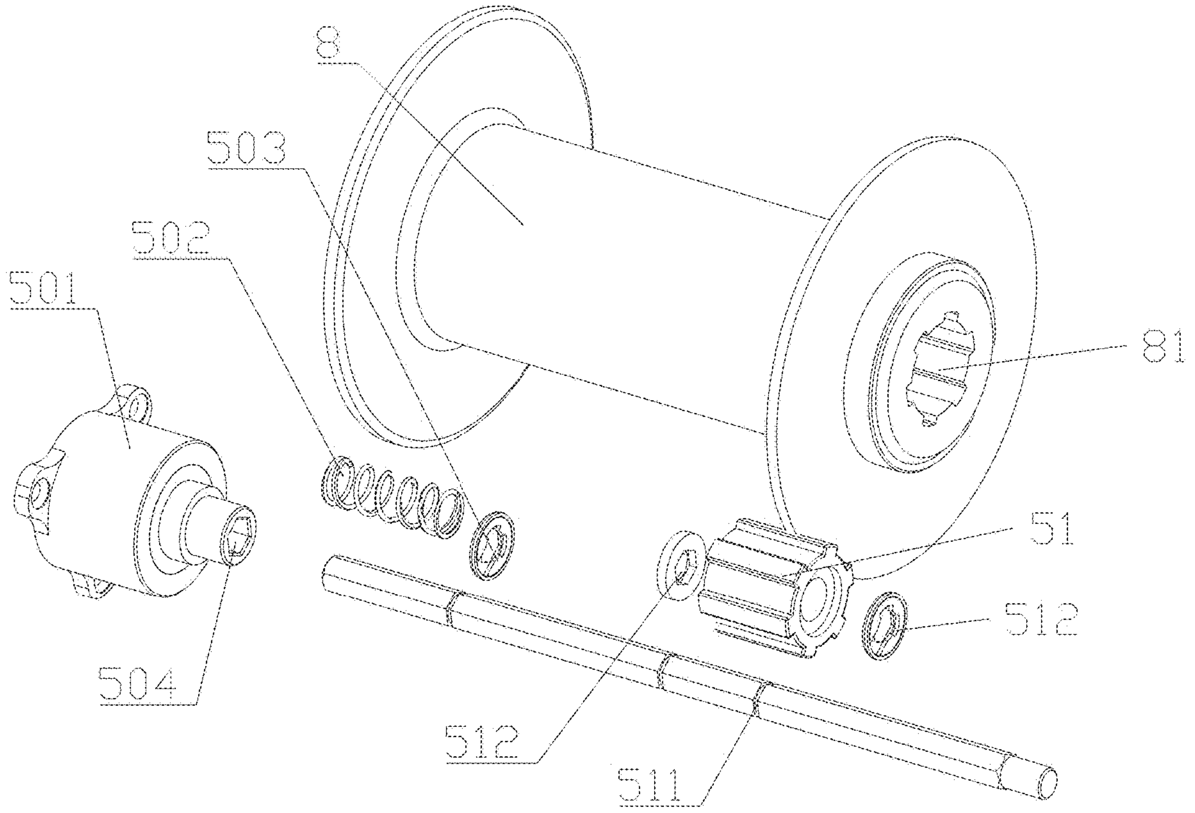
FIG. 3 is a schematic diagram illustrating an elastic connection assembly and a spline sleeve according to the present disclosure.

As shown in FIGS. 2 and 3, the elastic resetting assembly 50 comprises a coupling sleeve 501, a spring 502, and a spring positioning clamping ring 503; a left end of the coupling sleeve 501 is connected to an output shaft of the motor 2, and a right end of the coupling sleeve 501 is provided with a hexagonal insertion hole 504; the transmission shaft 5 is axially moved to be connected in the insertion hole 504; the spring positioning clamping ring 503 is fixedly fitted on the transmission shaft 5; the spring 502 is sleeved on the transmission shaft 5, a left end of the spring 502 is abutted against a right end surface of the coupling sleeve 501, and a right end of the spring 502 is abutted against the spring positioning clamping ring 503. With the spring positioning clamping ring 503 and the coupling sleeve 501, both ends of the spring 502 can be limited, and the axial movement of the transmission shaft 5 can be achieved under the action of the spring 502.

Figure 4:
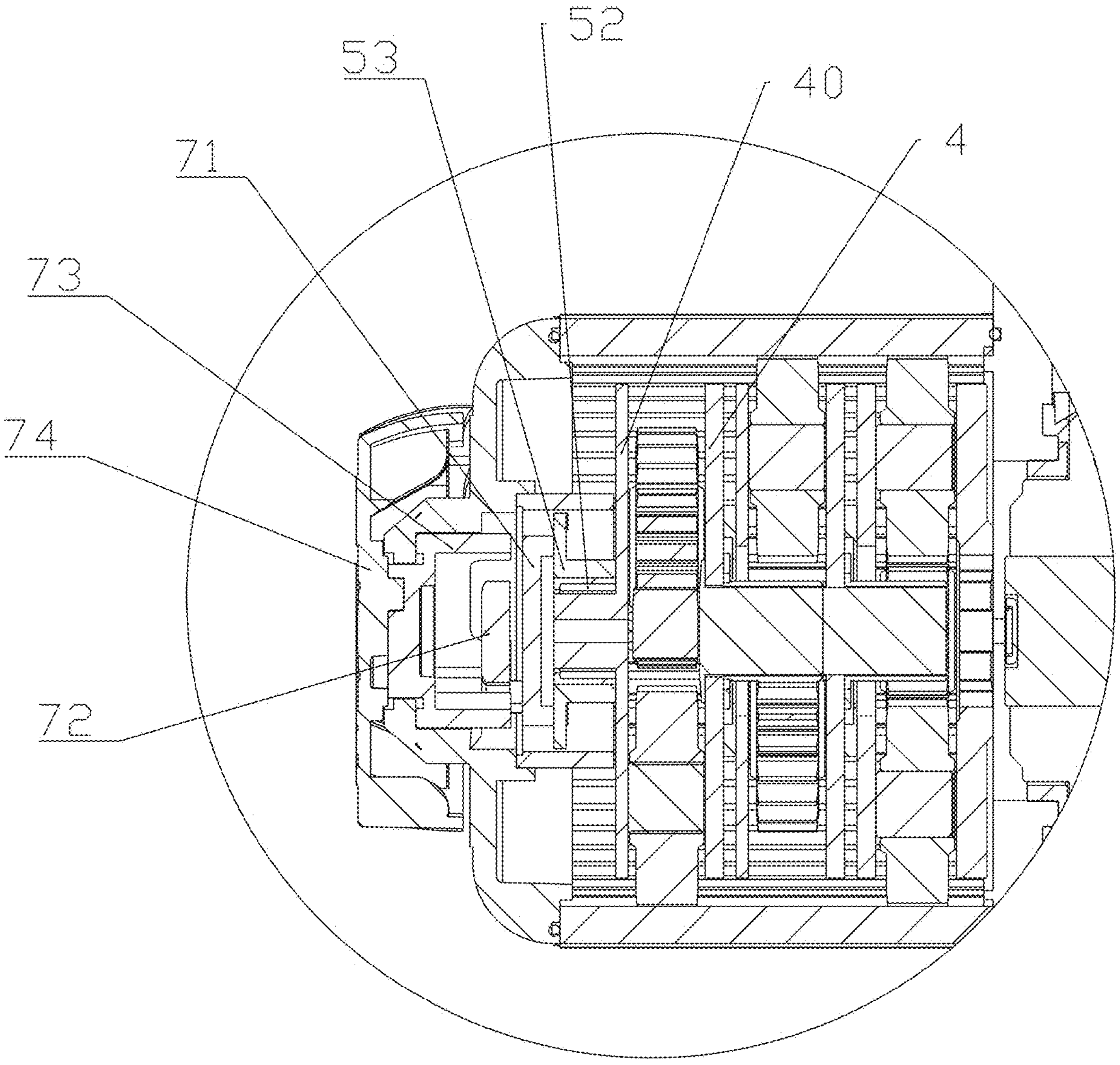
FIG. 4 is a sectional view illustrating a rotation assembly according to the present disclosure.
Figure 5:
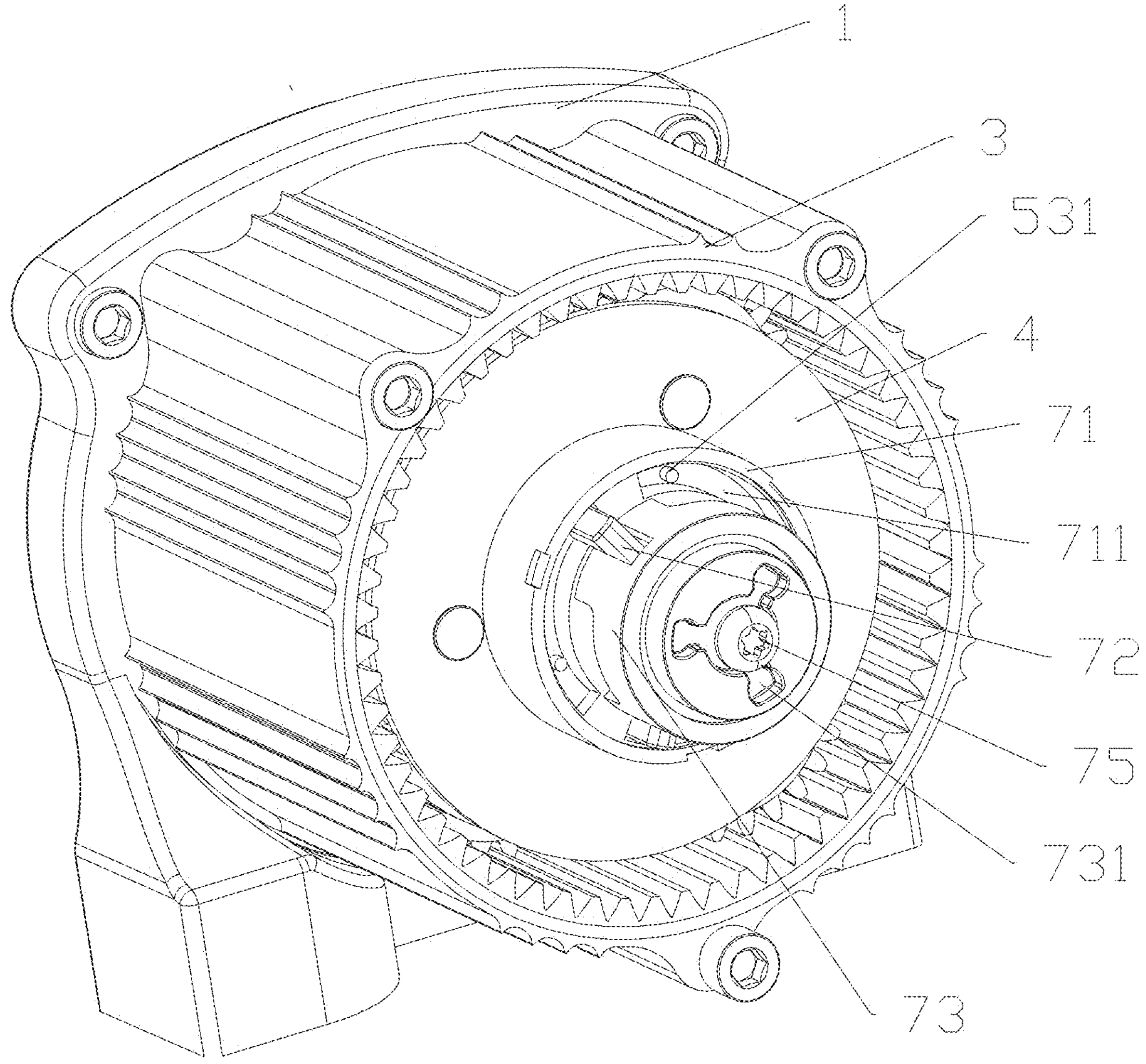
FIG. 5 is a schematic diagram illustrating a knob assembly according to the present disclosure.
Figure 6:
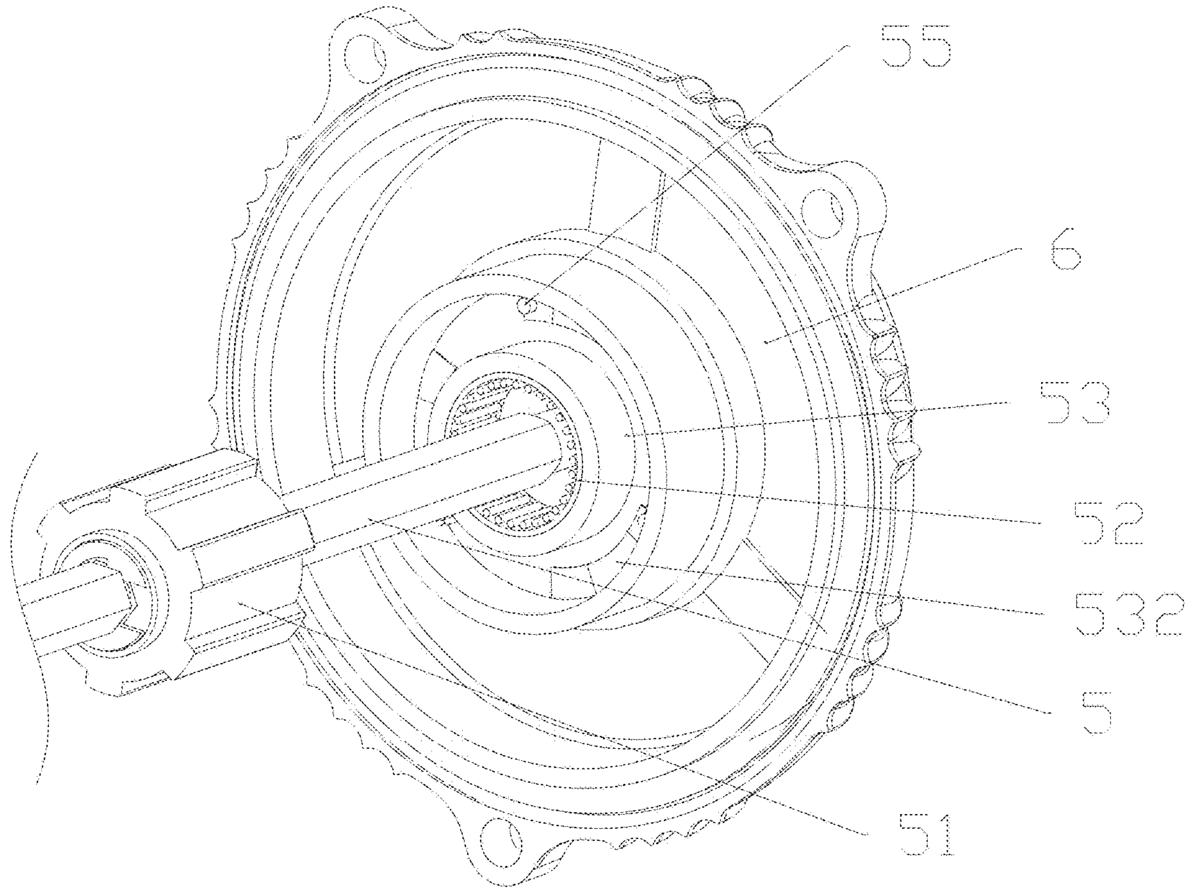
FIG. 6 is a schematic diagram illustrating an interior of a knob assembly according to the present disclosure.

As shown in FIGS. 2 to 4, three planetary gear sets 4 are disposed in the planetary gear housing 3; the spline sleeve 51 is rotatably sleeved on the middle segment of the transmission shaft 5; the spline sleeve 51 is in transmission cooperation with the leftmost planetary gear set 4. In a case of disengagement, the spline sleeve 51 is disengaged from a spline groove 41 in the center of the leftmost planetary gear set 4; in a case of engagement, the spline sleeve 51 is engaged with the spline groove 41 in the center of the leftmost planetary gear set 4; the right end of the transmission shaft 5 connects and penetrates through the rightmost planetary gear set 4; a spline positioning clamping groove 511 is respectively disposed at left and right sides of the spline sleeve 51 on the transmission shaft 5; a spline positioning clamping ring 512 is sleeved on each spline positioning clamping groove 511; left and right end surfaces of the spline sleeve 51 are respectively abutted against end surfaces of the two spline positioning clamping rings 512. With the spline sleeve 51, engagement and disengagement with the planetary gear set 4 can be easily realized. Further, with the spline positioning clamping rings 512, the spline sleeve 51 can be better limited, ensuring the spline sleeve 51 does not suffer axial displacement during rotation.

As shown in FIGS. 1 to 3, the device further comprises a winding drum 8. The winding drum 8 is rotatably connected to the winch bracket and sleeved on the transmission shaft 5, and further, a spline cooperation through hole 81 is disposed at a right end of the winding drum 8. The spline sleeve 51 is axially moved to be connected in the spline cooperation through hole 81, and thus the spline sleeve 51 drives the winding drum 8 to perform synchronous rotation. The spline sleeve 51 always drives the rotation of the winding drum 8. In a case of engagement, a left side of the spline sleeve 51 is located in the spline cooperation through hole 81, and a right side of the spline sleeve 51 is engaged with the spline groove 41 in the center of the planetary gear set 4; in a case of disengagement, the right side of the entire spline sleeve 51 is away from the spline groove 41, and moves toward the spline cooperation through hole 81, and thus the entire spline sleeve 51 is located in the spline cooperation through hole 81.

During use, the rotation knob 74 on the knob assembly 7 is first rotated clockwise to enable the rotation knob 74 to drive the rotation of the rotation wheel 73, and the rotation wheel 73 then drives the forking rods on the push forking block 72 to slide from the engagement segment 613 to the disengagement segment 611 along the radial drive inclined surfaces 61 under the limitation of the arc-shaped slide holes 711. During the slide process, due to a height difference, the push forking block 72 is pushed leftward and thus the push forking block 72 is abutted against the transmission shaft 5 so as to push the transmission shaft 5 leftward. The spline sleeve 51 on the transmission shaft 5 is disengaged from the spline groove 41 in the center of the planetary gear set 4 and hence the winding drum 8 sleeved on the spline sleeve 51 is disengaged from the center of the leftmost planetary gear set 4. In this case, the planetary gear set 4 is no longer in transmission connection with the winding drum 8, finally enabling the winding drum 8 to idle. The user can pull out the wire rope from the winch and hang it on a tree or rod on the site.

After the wire rope is fixed, the motor 2 is directly rotated counterclockwise by remote drive and the transmission shaft 5 is then driven to rotate counterclockwise by the motor 2, such that the transmission shaft 5 drives the rotation of the right side plate 40 on the rightmost planetary gear set 4 and thus the one-way bearing 52 on the right side plate 40 drives the rotation of the resetting drive piece 53. In this case, the resetting drive piece 53 also performs counterclockwise synchronous rotation. The resetting protrusions 531 at the right side of the resetting drive piece 53 are abutted against the forking rods 721 on the push forking block 72 so as to drive the forking rods 721 to perform counterclockwise rotation. Further, under the limitation of the arc-shaped slide holes 711, the forking rods 721 slide from the disengagement segment 611 to the engagement segment 613 along the radial drive inclined surfaces 61. During the slide process, due to the height difference and the limitation of the spring 502 of the elastic resetting assembly 50, the push forking block 72 and the transmission shaft 5 move rightward synchronously, and the spline sleeve 51 on the transmission shaft 5 is engaged with the spline groove 41 in the center of the planetary gear set 4 so as to enable the leftmost planetary gear set 4 to drive the rotation of the winding drum 8 on the spline sleeve 51, finally realizing power output of the winding drum 8 and ensuring normal operation of the winch.

In conclusion, the present disclosure has the following advantages: in this device, by rotating the knob assembly 7, the transmission shaft 5 is manually pushed leftward and the elastic resetting assembly 50 is put in a compressed state. When the winch needs to work, the motor 2 rotates to drive the rotation of the transmission shaft 5, and the transmission shaft 5 drives the rotation of the one-way bearing 52 on the right side plate 40 in the planetary gear set 4; the resetting protrusions 531 on the resetting drive piece 53 are enabled to abut against the forking rods 721 on the push forking block 72; the forking rods 721 rotate along the radial drive inclined surfaces 61 and finally, the push forking block 72 brings the knob assembly 7 back to an original state; with the restoring force of the elastic resetting assembly 50, the transmission shaft 5 is pushed rightward so as to realize automatic engagement of the engaging-disengaging winch without manually rotating back the knob assembly 7, thereby bringing conveniences to user, saving labor and time, and greatly improving the user experiences.

Although the present disclosure is made as above, the scope of protection is not limited hereto. Those skilled in the arts can, without departing from the spirit and scope of the present disclosure, make various changes and modifications. These changes and modifications shall all fall within the scope of protection of the present disclosure.

The invention claimed is:

1. An automatic resetting device of an engaging-disengaging winch, comprising a winch bracket, a motor, a gear box, at least two planetary gear sets, a transmission shaft and a knob assembly;

the motor and the gear box are respectively disposed at left and right sides of the winch bracket;

the planetary gear sets are mounted inside the gear box;

both ends of the transmission shaft are connected with the motor and the planetary gear sets, respectively;

a left end of the transmission shaft is in circumferential transmission cooperation with the motor, and the transmission shaft is cooperatively connected with the motor through axial movement;

an elastic resetting assembly is disposed between the transmission shaft and the motor;

the elastic resetting assembly enables the transmission shaft to have a tendency of moving rightward along an axial direction;

a right end of the transmission shaft is connected at the rightmost planetary gear set;

a one-way bearing is fixedly sleeved on a middle part of a right side plate in the rightmost planetary gear set, and a resetting drive piece is fixedly sleeved on the one-way bearing;

the resetting drive piece realizes unidirectional transmission through the one-way bearing;

a plurality of resetting protrusions are disposed circumferentially on the resetting drive piece;

the plurality of resetting protrusions are axially and elastically connected to the resetting drive piece and the plurality of resetting protrusions have a tendency of protruding rightward along an axial direction;

a push forking block for driving the transmission shaft to move axially is disposed between the resetting drive piece and the gear box;

the push forking block is abutted against the right end of the transmission shaft through the elastic resetting assembly, and a plurality of forking rods in transmission cooperation with the plurality of resetting protrusions are disposed circumferentially on the push forking block;

with the transmission cooperation of the plurality of resetting protrusions and the plurality of forking rods, and under an action of the elastic resetting assembly, the transmission shaft axially pushes rightward the push forking block for resetting;

the knob assembly is rotatably connected on the gear box, and is in transmission connection with the push forking block; and the knob assembly is configured to drive a rotation of the push forking block and enable the push forking block to axially push leftward the transmission shaft.

2. The automatic resetting device of the engaging-disengaging winch according to claim 1, wherein axially-penetrating axial through holes are disposed in the resetting drive piece;

moving rods are movably connected on the axially-penetrating axial through holes;

convex resetting elastic sheets are disposed between the moving rods and the resetting drive piece;

a first end of the convex resetting elastic sheets is fixedly connected with a left part of the moving rods, and a right part of the moving rods penetrates through a right end surface of the resetting drive piece to form the plurality of resetting protrusions; and a second end of the convex resetting elastic sheets is fixedly connected with a left side of the resetting drive piece.

3. The automatic resetting device of the engaging-disengaging winch according to claim 1, wherein a plurality of radial drive inclined surfaces are disposed circumferentially in an inner wall of the gear box;

a right end of each of the plurality of forking rods is abutted against a corresponding radial drive inclined surface of the plurality of radial drive inclined surfaces;

the knob assembly is in transmission connection with the push forking block; and the knob assembly is configured to drive the rotation of the push forking block and the push forking block axially drives the transmission shaft along a trajectory of the plurality of radial drive inclined surfaces.

4. The automatic resetting device of the engaging-disengaging winch according to claim 3, wherein both ends of each of the plurality of radial drive inclined surfaces are respectively provided with a first positioning part and a second positioning part for slidable positioning of the plurality of forking rods;

each of the plurality of radial drive inclined surfaces comprises a shallow-to-deep horizontal disengagement segment, an inclined transition segment, and a horizontal engagement segment;

the first positioning part is an axially-protruding positioning boss;

the first positioning part is disposed at a side of the shallow-to-deep horizontal disengagement segment away from the inclined transition segment;

in a state of disengagement, the plurality of forking rods are located on the shallow-to-deep horizontal disengagement segments, and limitedly abutted against the first positioning parts;

the second positioning part is an axially-protruding positioning boss;

the second positioning part is disposed at a side of the horizontal engagement segment away from the inclined transition segment; and in a state of engagement, the plurality of forking rods are located on the horizontal engagement segments and limitedly abutted against the second positioning parts.

5. The automatic resetting device of the engaging-disengaging winch according to claim 1, wherein the knob assembly comprises a positioning sleeve and a rotation wheel;

the positioning sleeve is sleeved on the right end of the transmission shaft and the positioning sleeve is fixedly connected with an inner wall of the gear box;

the positioning sleeve surrounds the plurality of resetting protrusions and a plurality of axially-penetrating arc-shaped slide holes are disposed circumferentially on the positioning sleeve;

each resetting protrusion of the plurality of resetting protrusions is located in a region corresponding to each of the plurality of axially-penetrating arc-shaped slide holes;

the push forking block and the transmission shaft are coaxially disposed, and a left side wall of the push forking block is abutted against the right end of the transmission shaft;

each of the plurality of forking rods is slidably cooperated in each of the plurality of axially-penetrating arc-shaped slide holes, and ends of the plurality of forking rods are in transmission cooperation with the plurality of resetting protrusions; and the rotation wheel is rotatably connected on the gear box, and the rotation wheel is connected with the push forking block and drives the push forking block to rotate.

6. The automatic resetting device of the engaging-disengaging winch according to claim 5, wherein a forking sheet mounting chamber for axial movement of the push forking block is disposed in a middle part of the rotation wheel;

axially-distributed forking rod grooves are disposed on a peripheral wall of the rotation wheel to realize a synchronous rotation of the rotation wheel and the push forking block, wherein the plurality of forking rods are fitted into the axially-distributed forking rod grooves; and the plurality of forking rods move along the plurality of radial drive inclined surfaces to make the push forking block move axially in the forking sheet mounting chamber.

7. The automatic resetting device of the engaging-disengaging winch according to claim 6, wherein the knob assembly further comprises a rotation knob;

a positioning fitting groove is disposed on a right end surface of the rotation wheel;

a positioning fitting block is disposed on the rotation knob;

the positioning fitting block is fitted to the positioning fitting groove and the rotation knob is fixedly connected by a switch screw to the rotation wheel; and the rotation knob is rotatably connected to a right side wall of the gear box.

8. The automatic resetting device of the engaging-disengaging winch according to claim 1, wherein the elastic resetting assembly comprises a coupling sleeve, a spring, and a spring positioning clamping ring;

a left end of the coupling sleeve is connected to an output shaft of the motor, and a right end of the coupling sleeve is provided with an insertion hole;

the transmission shaft is axially moved to be connected in the insertion hole;

the spring positioning clamping ring is fixedly fitted on the transmission shaft; and the spring is sleeved on the transmission shaft, a left end of the spring is abutted against a right end surface of the coupling sleeve, and a right end of the spring is abutted against the spring positioning clamping ring.

9. The automatic resetting device of the engaging-disengaging winch according to claim 1, wherein three planetary gear sets are disposed in the gear box;

a spline sleeve is rotatably sleeved on a middle segment of the transmission shaft;

the spline sleeve is in transmission cooperation with the leftmost planetary gear set;

in a state of disengagement, the spline sleeve is disengaged from a spline groove in a center of the leftmost planetary gear set;

in a state of engagement, the spline sleeve is engaged with the spline groove in the center of the leftmost planetary gear set;

a spline positioning clamping groove is respectively disposed at left and right sides of the spline sleeve on the transmission shaft;

a spline positioning clamping ring is sleeved on each spline positioning clamping groove; and left and right end surfaces of the spline sleeve are respectively abutted against end surfaces of the two spline positioning clamping rings.

10. The automatic resetting device of the engaging-disengaging winch according to claim 9, wherein the automatic resetting device further comprises a winding drum;

the winding drum is rotatably connected to the winch bracket and sleeved on the transmission shaft;

a spline cooperation through hole is disposed at a right end of the winding drum; and the spline sleeve is axially moved to be connected in the spline cooperation through hole, and the spline sleeve drives the winding drum to perform synchronous rotations.

* * * * *